July 13, 1965 R. A. HORROCKS 3,194,012
INJECTION HEAD FOR ROCKET
Filed March 31, 1961
FIG_1
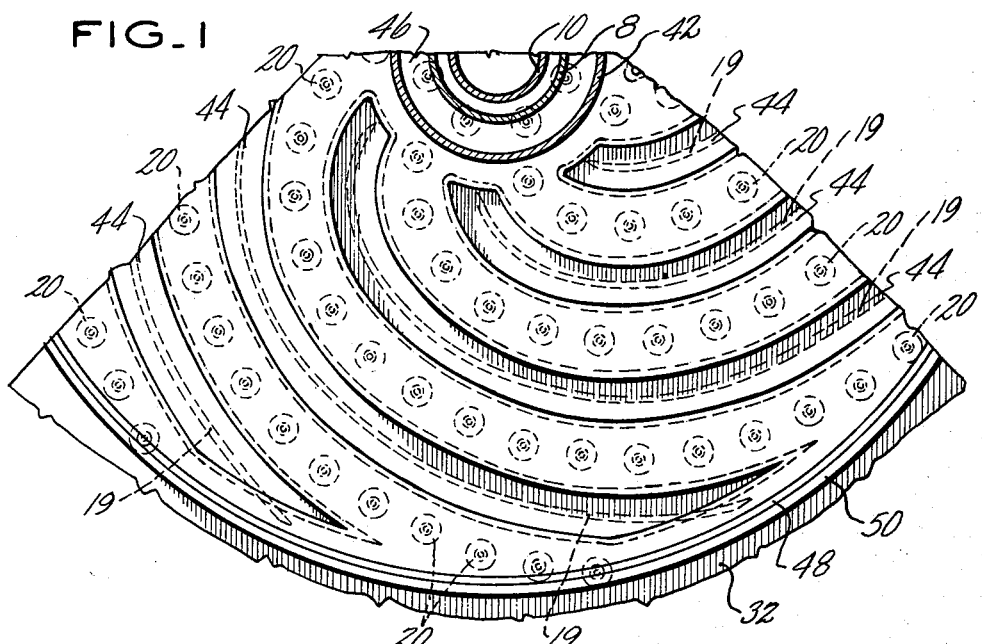
FIG.2
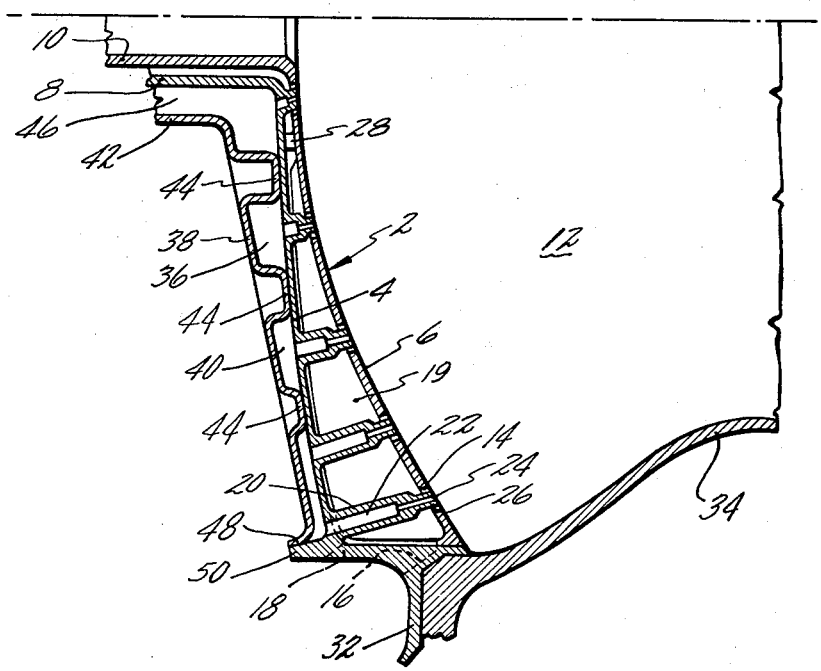
INVENTOR
REX A. HORROCKS
BY Charles A. Warren
ATTORNEY

United States Patent Office 3,194,012
Patented July 13, 1965

1

3,194,012
INJECTION HEAD FOR ROCKET
Rex A. Horrocks, Marlborough, Conn., assignor to United Aircraft Corporation, East Hartford, Conn., a corporation of Delaware
Filed Mar. 31, 1961, Ser. No. 99,735
8 Claims. (Cl. 60—35.6)

This invention relates to an injector head for a rocket.

One feature of the invention is an arrangement for maintaining maximum cooling of the injector head by controlling the flow of the propellants which act as coolants through passages within the head and over the wall surfaces of the injector head.

Another feature is the use of tapering supply passages in the head to assure a nearly uniform flow velocity within these passages and thereby provide a more uniform supply of propellant to the several nozzles.

Where the propellants are located in adjacent chambers within the injector head, one feature of the invention is a control of the chamber shape so as to maintain a nearly uniform delivery pressure for each propellant at the several nozzles and also to maintain a nearly constant flow velocity over the wall surfaces thereby to improve cooling of the wall surfaces.

Other features and advantages will be apparent from the specification and claims, and from the accompanying drawings which illustrate an embodiment of the invention.

FIG. 1 is a sectional view of the injector head.

FIG. 2 is a fragmentary elevation of the injector head as seen from the left of FIG. 1.

The injector head has a main structure 2 made up of plates 4 and 6 which are substantially in contact adjacent the center of the plates and which diverge from each other in a radially outward direction. Each of the plates 4 and 6 have centrally located sleeves 8 and 10 thereon, the sleeve 10 being positioned within and spaced from the sleeve 8, as shown. The plate 6, which directly faces the combustion chamber 12, has a plurality of openings 14 therein for the discharge of a propellant supplied to the space between the plates through passages 16 located in a sleeve 18 at the periphery of the plate 4. Plate 6 also has a plurality of spirally arranged flanges 19 thereon extending toward plate 4 to guide the fluid for uniform distribution among the several openings 14 located between adjacent flanges.

The plate 4, or back plate, has a plurality of projections 20 thereon corresponding in spacing to the openings 14, and these projections have passages 22 therein terminating in nozzles 24 which are located centrally of the openings 14. The ends of the projections 22 fit within the openings 14 but are smaller in diameter to provide an annular nozzle 26 through which the propellant discharges from between the plates.

The back plate 4 may be spaced from plate 6 as by projections 28 thereon which determine the spacing of the plates adjacent the sleeves 8 and 10. The spacing of these plates adjacent the peripheries is established by welding the plate 6 to the sleeve 18 where they are in contact.

With one of the propellants introduced through the passages 16 into the space between the plates, it will be apparent that this propellant is discharged through the nozzles 26 into the combustion chamber. This propellant flows through the space between the plates and as this space becomes progressively smaller the velocity of the flow of propellant over the inner face of the plate 6 will remain nearly uniform and substantially the same pressure will exist at all of the nozzles 26.

The sleeve 18 may have an integral projection rim 32 for the purpose of attaching the injector head to the peripheral wall 34 of the combustion chamber.

The second propellant is discharged into the combustion chamber from a supply chamber 36 formed between the back plate 4 and a cover plate 38 positioned on the side of the plate 4 remote from the face plate 6. This covering plate 38 has a plurality of grooves 40 formed therein, preferably in the shape of involutes, extending outwardly from a central sleeve 42 integral with a plate 38. These grooves have lands 44 therebetween which engage with the plate 4 and provide for spacing the main portion of the plate away from the back plate. The involute shaped grooves decrease in cross-sectional area in a radially outward direction as shown in FIG. 2 so that the involute shaped passages defined between the cover plate 38 and the back plate 4 also decrease in cross-sectional area.

The second propellant is introduced to the chamber 36 through the annular space 46 between the sleeve 8 and the sleeve 42 which is spaced from the sleeve 8 and this propellant, as it flows outwardly through the involute passages, retains a substantially uniform velocity by reason of the change of the dimension of the passages. It will be apparent that the projections 20 which are located on the plate 4 have to be in alignment with the involute shaped passages so that the second propellant will be supplied effectively to all of the nozzles 24. The periphery of the cover plate 38 may have a flange 48 thereon to provide for welding to an integral projecting flange 50 on the plate 4.

With this arrangement above-described, for assuring a substantially uniform flow of the propellant over both of the face plate 6 and the back place 4, it will be understood that a nearly uniform cooling effect is obtained for the injector head thereby minimizing thermal stress within the head and assuring effective operation of the injector head for the operative life of the rocket.

It is to be understood that the invention is not limited to the specific embodiment herein illustrated and described, but may be used in other ways without departure from its spirit as defined by the following claims.

I claim:

1. An injector head including a main structure having opposite walls and having a chamber therein, openings in one wall thereof for discharge of one propellant from the chamber and passages through said structure between opposite walls for the discharge of another propellant, and a cover plate on the wall of said structure opposite to the wall having the openings, said cover plate having involute shaped grooves therein extending from adjacent to the center of the cover plate to the periphery thereof, said grooves having lands therebetween engaging with the surface of said structure to define involute shaped passages, said last passages communicating with the first mentioned passages.

2. An injector head as in claim 1 in which each of the involute shaped grooves decrease in cross-sectional area from one end to the other.

3. An injector head as in claim 1 in which said another propellant is delivered to the passages between the cover plate and the structure adjacent the center of the structure, the involute grooves decreasing in area toward the periphery of the cover plate.

4. An injector head including a main structure having a face plate and a back plate, the face plate having spaced openings therein, and the back plate having projections thereon extending between the plates, said projections having passages therethrough, and the ends of the projections being received in the space openings in the face plate, said plates being secured together adjacent their centers and gradually diverging toward their peripheries with the projections increasing in length toward the periphery of the plates to compensate for the increasing spacing between said plates.

5. An injector head as in claim 4 in which a propellant is admitted to the space between the plates at their peripheries.

6. An injector head as in claim 4 in which spacing means holds the peripheries of the plates in spaced relation, the spacing means having openings therein for admitting propellant to the space between the plates.

7. An injector head including a main structure having a face plate and a back plate, the face plate having spaced openings therein and the back plate having projections thereon extending between the plates, said projections have passages therethrough and the ends of the projections being received in the space openings in the face plate, said plates being secured together adjacent their centers and gradually diverging toward their peripheries with the projections increasing in length toward the periphery of the plates to compensate for the increasing spacing between said plates, and a cover plate adjacent to and spaced from said back plate and having grooves therein with lands therebetween, said lands engaging said back plate to define by said grooves and back plate tapering passages for the flow of a propellant to the passages in said projections.

8. An injector head as in claim 7 in which said grooves and the tapering passages formed thereby are of involute configuration and are in alignment with the projections on the back plate.

References Cited by the Examiner
UNITED STATES PATENTS

| | | | |
|---|---|---|---|
| 2,703,962 | 3/55 | Olson | 60—39.74 |
| 2,741,085 | 4/56 | Prentis | 60—35.6 |
| 2,754,656 | 7/56 | Munger | 60—35.6 |
| 2,808,701 | 10/57 | Lewis | 60—35.6 |
| 2,982,097 | 5/61 | Hull | 60—39.46 |

SAMUEL LEVINE, *Primary Examiner.*

SAMUEL FEINBERG, ARTHUR M. HORTON,
*Examiners.*